United States Patent
Wilkins et al.

(10) Patent No.: US 7,000,435 B2
(45) Date of Patent: Feb. 21, 2006

(54) ROLL COATING OF GLASS FIBERS

(75) Inventors: Rodney R. Wilkins, Granville, OH (US); Jack Compston, New Lexington, OH (US)

(73) Assignee: Hollinee, LLC, Shawnee, OH (US)

( * ) Notice: Subject to any disclaimer, the term of this patent is extended or adjusted under 35 U.S.C. 154(b) by 0 days.

(21) Appl. No.: 10/841,265

(22) Filed: May 7, 2004

(65) Prior Publication Data

US 2004/0206130 A1    Oct. 21, 2004

Related U.S. Application Data

(62) Division of application No. 09/859,131, filed on May 16, 2001, now Pat. No. 6,779,365.

(51) Int. Cl.
*C03C 17/02* (2006.01)
(52) U.S. Cl. .............................. 65/443; 65/430; 65/529; 65/453; 65/377; 427/174; 427/209
(58) Field of Classification Search ................. 65/430, 65/443, 529, 453, 377; 427/174, 209
See application file for complete search history.

(56) References Cited

U.S. PATENT DOCUMENTS

| | | | | |
|---|---|---|---|---|
| 2,546,230 A | * | 3/1951 | Modigliani | 428/108 |
| 2,609,320 A | | 9/1952 | Modigliani | |
| 2,916,347 A | * | 12/1959 | Russell | 65/445 |
| 2,964,439 A | | 12/1960 | Modigliani | |
| 3,029,780 A | * | 4/1962 | Justus et al. | 118/126 |
| 3,873,291 A | * | 3/1975 | Miller | 65/448 |

* cited by examiner

*Primary Examiner*—Mark Halpern
(74) *Attorney, Agent, or Firm*—Jason H. Foster; Kremblas, Foster, Phillips & Pollick

(57) ABSTRACT

A roll coater for placing binder on the fibers prior to being wound around a rotating drawing drum. The drawing drum draws fibers out of orifices in the bottom of a slowly reciprocating furnace. The fibers form a mat on the drawing drum that is later removed and expanded. The roll coater includes a graphite or other material coating drum that rotates in a bath of liquid binder and/or wetting agents, and reciprocates with the furnace. The fibers scrape over the surface of the coating drum after being formed but before winding around the drawing drum. The binder and/or wetting agent picked up on the surface of the coating drum coats the fibers with binder and/or wetting agent. Liquid binder and/or wetting agent is replenished in the bath in which the coating drum is partially submerged by a float, sensor, pump and large container of binder/wetting agent.

4 Claims, 1 Drawing Sheet

ROLL COATING OF GLASS FIBERS

This application is a DIV of 09/859,131 filed May 16, 2001, now U.S. Pat. No. 6,779,365.

(e) BACKGROUND OF THE INVENTION

1. Field of the Invention

This invention relates generally to formation of a glass fiber mat using the method commonly referred to as the Modigliani method, and more particularly relates to a means and method for coating the glass fibers with binder and/or wetting agents after formation but before collecting in a mat.

2. Description of the Related Art

Fiberglass mats, which subsequently can be infiltrated with a matrix material such as a polymer resin to form a composite, are formed conventionally by different methods. One method for making fiberglass mats is described in several patents to Modigliani, U.S. Pat. Nos. 2,546,230; 2,609,320 and 2,964,439, all of which are herein incorporated by reference.

These patents disclose an apparatus in which a slowly reciprocating, melting furnace feeds molten glass through spinning orifices which discharge an array of fine, continuous glass filaments or fibers that are wrapped circumferentially around a rapidly rotating drawing drum. The melting furnace reciprocates relatively slowly in a longitudinal direction above the drum's rapidly rotating circumferential surface, thereby forming a build-up of continuous fibers oriented at acute angles with one another. During winding of the fibers on the rotating drum, a binder, such as a thermosetting resin, is applied by spraying the fibers already deposited on the drum to bind the fibers at their overlapping junctions with fibers of previously deposited layers.

After a suitable thickness of fibers has been created, the condensed mat is removed from the drum by forming a longitudinal cut through the mat parallel with the axis of the drum. The condensed mat is subsequently deposited on a conveyor belt that moves at a very slow rate. The severed condensed mat is generally rectangular in shape, and the fibers in the mat extend, due to the orientation of the rectangular mat on the conveyor, substantially completely across the width of the mat substantially perpendicular to the direction of movement of the conveyor belt.

At the exit end of the conveyor belt, a retarding roller presses the condensed mat against the conveyor belt, which is supported by an oppositely rotating support roller. The leading end of the condensed mat beyond the retarding roller is stretched or expanded longitudinally up to hundreds of times its original, condensed length. The expanding is a continuous process with the leading end being pulled longitudinally while the retarding roller/support roller structure minimizes the forward movement of the remaining length of the condensed mat.

As the mat expands longitudinally, it also expands ("fluffs") in the direction of the mat's thickness to a consistency resembling cotton candy. And during the expansion of the mat, the fibers that are originally oriented transversely to the direction of movement are pulled longitudinally, thereby tending to rotate and reorient the fibers to a 45 degree or greater angle with respect to the longitudinal direction. During the expansion process, in which the original mat increases in length enormously and "fluffs" to a significantly greater thickness, the mat necks down to a smaller width.

After the majority of the expanding takes place, the fluffed, expanded mat is compressed in the direction of its thickness by rolling and it is heated by radiant heaters to set the thermosetting resin incorporated during the winding of the fibers on the drum. Thereafter, the stretched glass fiber mat is wound on a spool, on which it may be transported to other locations for use in various structures such as heat, thermal and sound insulation, mechanical parts formed, for example, by pultrusion or molding, and filters.

The conventional manner of placing the binder on the fibers is to spray the layer of fibers with a binder after the fibers are wound around the drum. However, this spray coats not only the layer of fibers just wound, but to some extent also further coats fibers that were wound earlier, and were coated sufficiently with binder already. Additionally, when the binder is placed on the outwardly facing sides of the fibers, enough binder must be sprayed to wet the fibers so that the contact points between fibers (on the other sides of the fibers) contain binder. This results in superfluous coating of fibers with binder, which results in unnecessary expense and potentially undesirable properties due to excessive binder.

Therefore, the need exists for a method and apparatus that applies binder and/or a wetting agent to the fibers only to the extent necessary to cause the fibers to bind to one another.

(f) BRIEF SUMMARY OF THE INVENTION

The invention is an improved apparatus for forming a fiberglass mat. The apparatus includes a glass-containing furnace that reciprocates along a reciprocation path near a drawing drum. The drawing drum is mounted to rotate around a drawing drum axis. The drawing drum axis is aligned substantially parallel to the path of furnace reciprocation for drawing glass fibers along a fiber path extending from furnace orifices to the drawing drum. This apparatus winds the glass fibers around the drawing drum to form a mat.

The improvement comprises a coating drum having an axis about which the coating drum is rotatably mounted. The coating drum is disposed with a circumferential surface in the fiber path. A prime mover is drivingly linked to the coating drum for driving the coating drum about its axis. The coating drum preferably reciprocates with the furnace.

In a preferred embodiment there is also a bath containing a pool of liquid binder and/or wetting agents in which at least a portion of the circumferential surface of the coating drum is submerged for picking up binder and applying it to the fibers. In a still more preferred embodiment, a coating drum cleaner, such as a wide brush, is mounted with a cleaning edge in contact with the circumferential surface of the coating drum. The brush cleans debris from the circumferential surface of the coating drum.

The binder or wetting agents applied by the invention is applied prior to the deposition of fibers onto the drawing drum but after fiber formation from the furnace. The invention eliminates the need for spraying the fibers after deposition on the drawing drum, thereby saving the cost of superfluous binder and/or wetting agents, and making expansion of the condensed mat much easier.

(g) BRIEF DESCRIPTION OF THE SEVERAL VIEWS OF THE DRAWINGS

Figure 2:
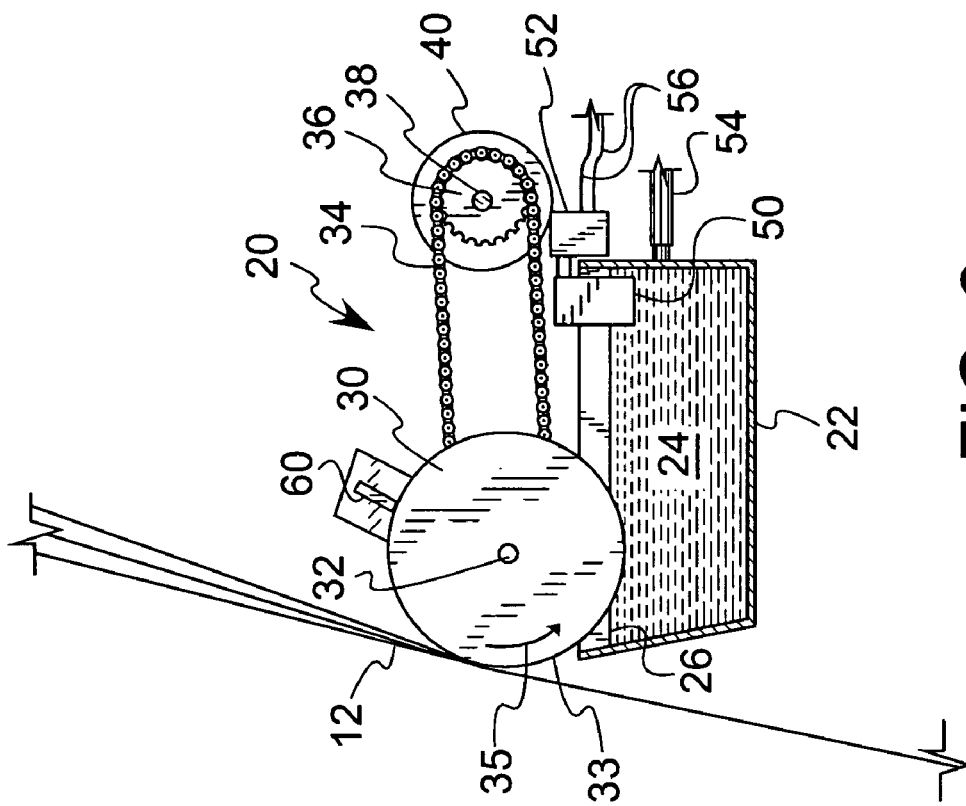
FIG. 2 is a side view illustrating the preferred embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

(h) DETAILED DESCRIPTION OF THE INVENTION

Figure 1:
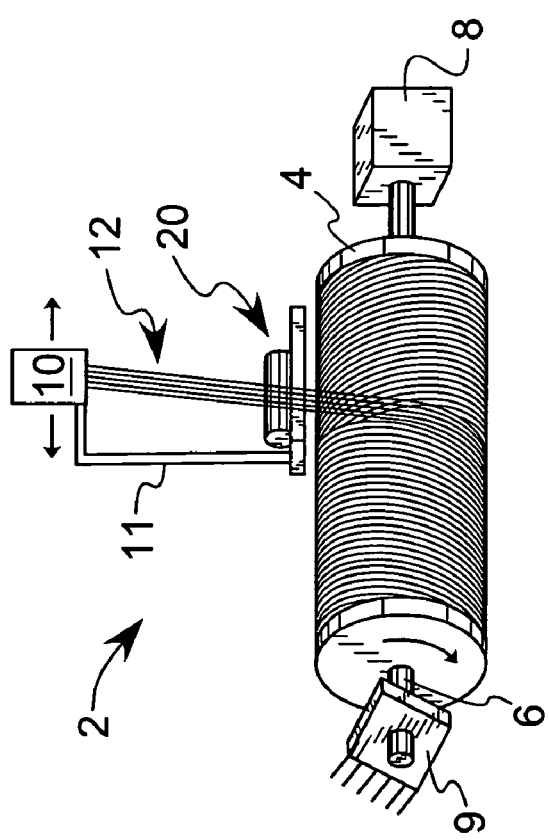
FIG. 1 is a schematic view in perspective illustrating the entire fiber mat forming machine with which the invention is operated.

The apparatus 2 with which the present invention is used is shown in FIG. 1. The drawing drum 4 is rotatably mounted about an axle 6 that is rotatably driven by a conventional drive means 8, such as an electric motor. The drive means 8 may be directly linked to the axle 6, or it may be driven through a linkage (not shown). The axle 6 is rotatably mounted in a bearing 9, thereby permitting continuous, rapid rotation of the drum 4 about the axle 6.

The glass-containing, reciprocating furnace 10 is disposed above the drawing drum 4 with the glass fibers 12 extending from the lower end thereof toward the drawing drum 4. The lower end of the furnace 10 contains orifices through which molten glass contained in the furnace 10 flows to form larger diameter, very slowly flowing streams. The molten glass streams begin to cool as they pass through the orifices, and with the lower ends wound around the rapidly rotating drawing drum 4, the molten glass streams are drawn into the much smaller diameter continuous fibers 12 as they move at a speed on the order of 1,900 feet per minute near the drawing drum's surface. The fibers 12 extend along a fiber path that begins at the furnace 10 and ends where the fibers contact the circumference of the drawing drum 4.

The fibers 12 are spaced apart in an array that is commonly approximately two inches thick by about 12 inches wide. Of course, these are only representative dimensions that can be varied greatly to suit a particular set of circumstances as will be understood by a person having ordinary skill in the art. This array is ordinarily angled relative to the axis of the drawing drum 4 from as much as 90 degrees to as little as 45 degrees, and preferably about 75 degrees. This angle causes a 12 inch wide and two inch thick array of fibers to form a layer of fibers on the circumferential surface of the drawing drum 4 less than 12 inches once the spaces between the fibers in the array are reduced to essentially zero. For example, for the array discussed above at a 75 degree angle, the width of the layer might be approximately four inches in a conventional machine. With the preferred embodiment of the present invention, the width can be reduced to approximately one inch or even less.

The reduction in the width of the layers of fibers is due to the roll-coater 20 in FIG. 1. The roll coater 20 is interposed along the length of the fiber path between the furnace 10 and the point of contact of the fibers 12 with the drawing drum 4. The roll-coater 20 will be described in more detail presently with reference to FIG. 2.

The roll coater 20, which is mounted between the furnace 10 and the drawing drum 4, is most preferably drivingly linked to the furnace 10 by the link 11, and is preferably disposed beneath the furnace 10 and above at least the part of the circumferential surface of the drawing drum 4 where the fibers 12 first contact the drawing drum 4. The roll coater 20 includes a bath 22 that contains a pool of liquid binder 24 having an upper surface 26. The term "binder/wetting" agent refers to conventional agents used to bind glass fibers together. This term also includes wetting agents in combination with the glass fiber binder or as an alternative to a conventional glass fiber binder. The coating drum 30 is rotatably mounted about its axle 32 to a member rigidly mounted to the bath 22 with the lower part of the circumferential surface of the coating drum 30 submerged beneath the surface 26 of the binder/wetting agent 24 (as shown in hidden lines in FIG. 2). The coating drum 30 is preferably about three inches in diameter and its outer surface is graphite due to the low friction properties and lack of reaction of graphite with glass and conventional binders/wetting agents. Of course, the coating drum 30 could be made of a material other than graphite, such as a ceramic, polished bronze or a low friction polymer sold under the trademark DELRIN, depending upon compatibility with the binder/wetting agent and glass.

One side of the endless loop drive chain 34 extends around a sprocket (not shown) on the axle 32 of the coating drum 30. The opposite side of the drive chain 34 extends around a different sprocket 36 drivingly linked to the driveshaft 38 of a prime mover, such as the electric motor 40. This drive means is merely exemplary, of course, and it will be understood by the person having ordinary skill that equivalent drive means could be substituted therefore, including a belt or rope drive, direct shaft drive, hydraulic or pneumatic drive, linear motor, etc. Furthermore, the preferred prime mover could be replaced by a different prime mover, such as a hydraulic or pneumatic motor, an internal or external combustion engine or some other prime mover.

The coating drum 30 is driven to rotate about the axle 32 at a speed on the order of 40 to 100 revolutions per minute (rpm) in the direction shown by the arrow 35, and the outer, circumferential surface 33 revolves around the axle 32. The surface 33 is partially submerged in the binder/wetting agent 24 while its distal side contacts the fibers 12. This apparatus carries the binder/wetting agent from the bath 22 to the fibers 12 in a layer on the circumferential surface 33 that has a thickness determined by the surface tension and viscosity of the liquid and the molecular attraction between the liquid and the coating drum 30.

When the fibers 12 contact the layer of binder/wetting agent on the circumferential surface 33, the fibers become coated with binder/wetting agent and carry that binder/wetting agent to the drawing drum 4 shown in FIG. 1. The binder/wetting agent adheres to the points of contact between the already-deposited fibers and the fibers that are being deposited. Once cured, the binder/wetting agent functions in the conventional manner to bind the fibers together to form the mat.

The fibers 12 that contact the drum surface 33 have the spaces between them reduced to at least some extent, thereby "compressing" the array from its original size, for example 12 inches by two inches, to a new size, for example less than 12 inches wide and the thickness of a few fibers. Therefore, when the new, compressed array is wound around the drum 30, its width is on the order of an inch.

The new, compressed array mat that is formed is thinner, for example 30% to 35% thinner than conventional mats of the same weight per unit area, but with more individual tows of fibers rather than being filamentized as with the prior art mats. This results in a final mat that is more of an open weave, which provides better wet-through properties with resin that is later applied to the mat to form the composite's matrix.

Additionally, because the invention only coats each fiber with binder/wetting agent once, as opposed to the prior art in which the fibers are coated many times by spraying and overspray, the mat expands much more easily. Therefore, the cost of the excess binder/wetting agent is saved and the ease in expanding the mat is enhanced with the present invention.

As binder/wetting agent is removed from the bath 22 and placed on the fibers, the upper surface 26 begins to drop. The float 50, which floats in the binder/wetting agent 24 and is mounted to the sensor 52, drops with the upper surface 26 of the binder/wetting agent 24. When the float 50 drops to a predetermined position, the sensor signals a small pump (not shown) through the wires 56 to pump more binder/wetting agent from a larger container into the bath 22 through the tube 54, which has a passageway in fluid communication with the interior of the bath 22. Once the float 50 raises with the upper surface 26 to a second predetermined position, the sensor 52 signals the pump to stop pumping more binder/wetting agent into the bath 22.

A cleaner, preferably a scraping blade or the brush 60, is mounted with its inner edge contacting the circumferential surface 33 of the coating drum 30. The brush 60 contacts the coating drum 30 and extends the entire width of the circumferential surface 33 to scrape against the circumferential surface 33 and stop any fibers or fiber pieces that may break off of the array extending from the furnace 10. The brush 60 also evens out the layer of binder/wetting agent on the circumferential surface 33 so that it is even when the fibers contact it.

It can be seen from the above description that as the coating drum 30 rotates at a speed much slower than the fibers 12 passing over the outer surface of the coating drum 30, the fibers will pick up binder/wetting agent that will cause the deposited fibers to bind together. The binder/wetting agent preferably wets the entire outer surface of the fibers 12. There is a reduced need for spraying binder, with its attendant waste of binder due to spraying fibers multiple times, and there is only as much binder in the finished product as is necessary to ensure binding at most or all intersections of fibers. Therefore, one embodiment includes spraying in addition to applying with a coating drum and another only applies binder with a coating drum. Finally, this invention places binder/wetting agent on the entire outer surface of each fiber prior to depositing it on the already-deposited fibers, which ensures that binder/wetting agent is positioned on the parts of the fibers that will seat against already-deposited fibers. The prior method of spraying the fibers after deposition does not ensure such placement of the binder.

While certain preferred embodiments of the present invention have been disclosed in detail, it is to be understood that various modifications may be adopted without departing from the spirit of the invention or scope of the following claims.

What is claimed is:

1. A method of applying binder/wetting agent to a plurality of fibers that are formed by drawing the fibers through a fiber path extending downwardly from orifices in a glass-containing furnace that reciprocates along a reciprocation path above a drawing drum to the drawing drum, said drawing drum being rotated around an axis that is aligned substantially parallel to the path of furnace reciprocation, and winding the glass fibers around the drawing drum, the method comprising:

(a) drivingly linking a roll coater to the furnace, the roll coater including a coating drum, having an axis about which the coating drum is rotatably mounted, below the furnace orifices and above the drawing drum with a circumferential, side surface of the coating drum in the fiber path, and in contact with substantially all of the fibers extending downwardly from the furnace orifices to the drawing drum, the roll coater also including a bath below the furnace orifices and the coating drum, the bath containing a pool of liquid binder/wetting agent in which at least a portion to the circumferential surface of the coating drum is submerged for picking up binder/wetting agent and applying it to substantially all of the fibers; and (b) rotating the coating drum about its axis.

2. The method in accordance with claim 1, further comprising scraping the circumferential surface of the coating drum for removing debris from the circumferential surface of the coating drum.

3. The method in accordance with claim 2, further comprising reciprocating the coating drum and bath with the furnace.

4. A method of applying binder/wetting agent to a plurality of fibers that are formed by drawing the fibers through a fiber path extending downwardly from orifices of a glass-containing furnace that reciprocates along a reciprocation path above a drawing drum to the drawing drum, said drawing drum being rotated around an axis that is aligned substantially parallel to the pat of furnace reciprocation, and winding the glass fibers around the drawing drum, the method comprising:

(a) drivingly linking a roll coater to the furnace, the roll coater including a coating drum, having an axis about which the coating drum is rotatably mounted, below the furnace orifices and above the drawing drum with a circumferential, side surface of the coating drum in the fiber path, and in contact with substantially all of the fibers extending downwardly from the furnace orifices to the drawing drum, the roll coater also including a bath below the furnace orifices and the coating drum, the bath containing a pool of liquid binder/wetting agent in which at least a portion to the circumferential surface of the coating drum is submerged for picking up binder/wetting agent and applying it to substantially all of the fibers;

(b) rotating the coating drum about its axis;

(c) scraping the circumferential surface of the coating drum for removing debris from the circumferential surface of the coating drum; and (d) reciprocating the coating drum and bath with the furnace.

* * * * *